W. H. PARMELEE.
Evaporator.
No. 45,072.
Patented Nov. 15, 1864.
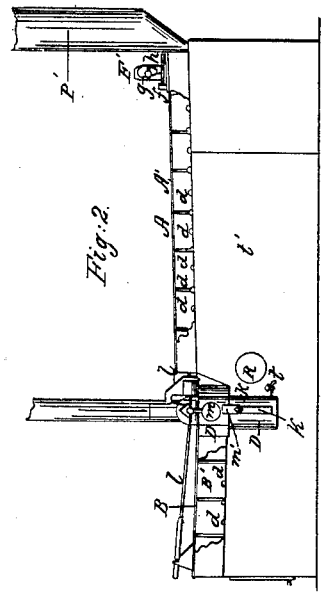
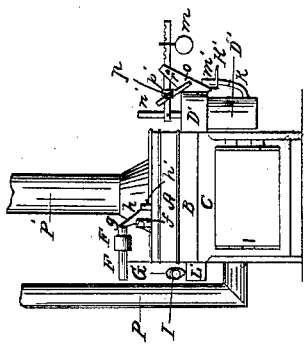
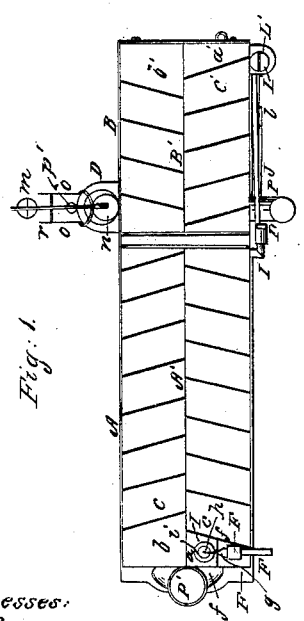
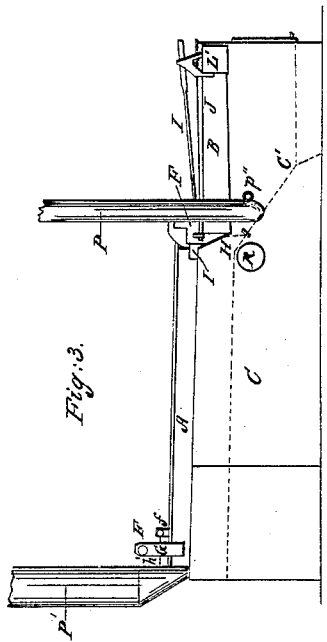

UNITED STATES PATENT OFFICE.

WM. H. PARMELEE, OF HOPKINS, MICHIGAN.

IMPROVED EVAPORATOR.

Specification forming part of Letters Patent No. 45,072, dated November 15, 1864.

*To all whom it may concern:*

Be it known that I, WILLIAM H. PARMELEE, of Hopkins, in the county of Allegan and State of Michigan, have invented certain new and useful Improvements in Evaporators; and I do hereby declare that the following is a full and complete description of the construction and operation of the same, reference being had to the accompanying drawings, making a part of this specification, in which—

Figure 1 is a top view of the evaporator. Fig. 2 is a side elevation. Fig. 3 is a view of the side opposite from Fig. 2. Fig. 4 is an end view.

Similar letters of reference denote like parts in the different views.

My improvement relates to the manner of regulating the flow of sap from the reservoir into a pan of the evaporator, and from one pan to another, and to the final discharge of the sirup from the evaporator, whereby the same quantity of fluid is kept continually in the pans, and sirup of uniform thickness discharged therefrom without further care or attention.

My improvement is also in the construction and position of the pans, so as to secure a perfect drainage and a flow of clear sap through the center of the pans, being in all respects an evaporator most perfect and complete in its operation, saving a great amount of care and labor.

A and B represent the pans, which should be made of sheet-iron or copper placed on a brick arch or furnace, C. The front pan B is designed to extend only over the fire-place, (indicated by the dotted lines C' in Fig. 3,) and is inclined downward on the furnace from the front to the end from which sirup is discharged. The back pan B can be of any desired length, and is placed on the furnace inclined downward from the back to the front. These pans are made up of subdivisions, being divided longitudinally through the center, and the partitions in the back pan B, extending from the sides to the center of the pan, are inclined forward, as represented, and the partitions in the front pan are inclined backward, to guide the flow of the sirup through the pans in the desired manner, which runs from one division to another through holes or apertures *d* in the center partitions, A' B', at the bottom of the pans.

At the back end of the evaporator, on one side, are arranged the devices for regulating the flow of sap into the pan A, which consist of a pipe, F, supported by a standard, G, extending up from the side of the pan, designed to be connected with the reservoir of sap. On the end of this pipe is a valve-seat, F', and *g* is a valve with a plug in the end, that moves in relation to the valve-seat, opening or closing the pipe. The valve *g* is attached to an arm, *h*, secured to shaft *h'*, that is supported and turns in pieces *f*, secured to the pan. The other end of this arm is pivoted to a rod connected to a float, *i*, in the curb L, secured in a division, *a*, of the pan. This valve is operated by the sap running through the pipe, opening the valve until the sap is a certain height in the curb L, when the float will rise, moving the valve up against the seat, closing the opening in the pipe, that is continually opened or closed according to the height of the fluid in the curb. There are holes around the lower end of the curb, through which the sap passes into the divisions. From the division *a* it runs into the division *b*, and from *b* to *c*, and so on through the holes *d* into all the divisions of the pan A; and the sirup is conveyed from the pan A to the pan B, through the bent tube or pipe I, along the trough J, into the curb L'.

The discharge of the sirup from the tube I is regulated by a valve, I', operating in a similar manner to the one just described, being connected by a rod, *l*, to the float L'', that rises and falls according to the height of the fluid in the curb L', opening or closing the valve. The fluid runs from the curb L', through an aperture, into the division *a'*, and from *a'* to *b'*, and so on through all the divisions of the pan B until the sirup runs out into the curb D, down into a cistern, D', from which it is discharged by a self-regulating valve. This valve is connected by a stem, *p*, to a lever or balance-beam, *p'*, one side of the center, the beam balancing on a pin, *r*, supported by the pieces *o*, extending up from the curb D. To the inside end of the lever is connected, by the rod *n'*, a float or weight, *n*, that extends down into the cistern, and on the other end of the lever is arranged a balance-weight, *m*.

*k* is a curved tube extending up from the lower part of the cistern, at the upper end of which is the valve-seat *m'* and spout *k'*. The sirup in the cistern rises in the tube $k$, and when the valve is raised runs out at the spout $k'$ into a vessel placed to receive it. The valve is operated, regulating the discharge of sirup of a uniform thickness, by means of the floating weight $n$ and balance-weight $m$. The weight $n$ should be large enough to displace about three quarts of sirup and heavy enough to sink in the thickest sirup that is ever desired to be made. As the specific gravity of the fluid varies in the process of evaporation, growing heavier as it becomes thicker, the balance-weight $m$ must be adjusted on the beam so as to raise the floating weight in sirup of such density or thickness as it is desired to have run off, for, as the float thus rises, it elevates the valve and discharges the sirup. If the sirup should run too fast, it will be thinner and lighter; but the floating weight, as if noting the change, descends, diminishing the stream, and if it runs too slow it will grow thicker, but at the same time so much more buoyant that it will raise the weight, increasing the stream, thus becoming a self-regulator, discharging sirup of any desired density from the evaporator with a remarkable uniformity and accuracy.

The different valves, as described, for regulating the quantity of fluid in the pans and discharging the sirup, act in perfect uniformity, keeping constantly the same amount of fluid in the pans, which, when sufficiently evaporated to any desired density, runs off without further care or attention, and saving a great amount of labor. The sirup can be left boiling in the pans at night or any time without further solicitude, for the sirup, as it is sufficiently evaporated, will run into a vessel placed to receive it, and when the pans stop boiling the floats will rise, preventing any more sap coming from the reservoir.

$t$ is a faucet at the lower end of the cistern to draw off the sirup that remains in the cistern after the pans are emptied.

The position of the pans on the furnace, the back pan sloping forward in the direction that the sirup runs from the reservoir and the front pan sloping backward to the place of discharge, together with the partitions being inclined, as represented and described, facilitate the distribution of the fluid through the pans and secures a more perfect drainage. The fluid in boiling rolls the scum to the sides of the pans, and the connection between the divisions being along the center, the sap or sirup runs clear, through the holes $d$, along the center of the pans, leaving the scum principally in the back divisions.

The fire-place of the furnace is under the pan B, and between it and the flue, under the pan A, or in the throat of the furnace, there is a damper (indicated by the dotted line H in Fig. 3) that can be turned forward, shutting off the heat from under the pan A, and as the damper is turned forward it leaves an opening underneath to admit fresh air under the pan A, there being openings R in the sides of the furnace to allow a current of cool air to pass in for that purpose. This arrangement is desirable in finishing up boiling when the sap is exhausted from the reservoir and runs low in the back pan, and would be in danger of burning, but by turning the damper H the heat is shut off and a current of cool air admitted under the pan A, when the boiling can be finished up in the front pan, B, turning the damper in the side chimney, P, by the pin $p''$, (seen in Fig. 1,) so as to allow the smoke to pass out. When the damper H is turned back, the heat and smoke from the fire-place pass along under the pan A and out at the chimney P' at the back end of the evaporator.

The pans A and B are separate from each other and from the furnace, and can be removed at any time.

What I claim as my improvement, and desire to secure by Letters Patent, is—

1. The arrangement of the pipe I, trough J, valve I', rod $l$, float L'', and curb L, in combination with the pans A and B when operating conjointly, substantially as and for the purpose specified.

2. The float $n$, cistern D', valve with the stem $p$, balance-beam $p'$, in combination with the evaporator, substantially as and for the purpose set forth.

WM. H. PARMELEE.

Witnesses:
W. H. BURRIDGE,
A. W. McCLELLAND.